United States Patent

Chung et al.

(10) Patent No.: US 8,977,800 B2
(45) Date of Patent: Mar. 10, 2015

(54) MULTI-PORT CACHE MEMORY APPARATUS AND METHOD

(75) Inventors: Moo-Kyoung Chung, Yongin-si (KR); Soo-Jung Ryu, Hwaseong-si (KR); Ho-Young Kim, Seoul (KR); Woong Seo, Hwaseong-si (KR); Young-Chul Cho, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 134 days.

(21) Appl. No.: 13/362,460

(22) Filed: Jan. 31, 2012

(65) Prior Publication Data

US 2012/0221797 A1    Aug. 30, 2012

(30) Foreign Application Priority Data

Feb. 25, 2011    (KR) .................. 10-2011-0017412

(51) Int. Cl.
*G06F 12/08*    (2006.01)

(52) U.S. Cl.
CPC ........ *G06F 12/0853* (2013.01); *G06F 12/0846* (2013.01)
USPC ............... 711/5; 711/131; 711/118; 711/127; 712/14; 365/149

(58) Field of Classification Search
USPC ............................ 711/131, 127, 118, 149, 14
See application file for complete search history.

(56) References Cited

U.S. PATENT DOCUMENTS

| | | | | |
|---|---|---|---|---|
| 5,247,649 A * | 9/1993 | Bandoh | ......................... | 711/130 |
| 5,801,708 A * | 9/1998 | Alcorn et al. | ................. | 345/587 |
| 5,924,117 A | 7/1999 | Luick | | |
| 5,968,160 A * | 10/1999 | Saito et al. | ...................... | 712/14 |
| 6,088,760 A * | 7/2000 | Walker et al. | ................. | 711/104 |
| 6,604,174 B1 * | 8/2003 | Dean et al. | .................... | 711/131 |
| 6,845,429 B2 | 1/2005 | Mattausch et al. | | |
| 6,898,690 B2 * | 5/2005 | Ramagopal et al. | .......... | 711/202 |
| 7,360,024 B2 * | 4/2008 | Hironaka et al. | ............. | 711/131 |
| 7,526,612 B2 | 4/2009 | Nakazato | | |
| 7,694,077 B2 | 4/2010 | Hironaka et al. | | |
| 2001/0029571 A1 * | 10/2001 | Shibayama | .................... | 711/118 |
| 2004/0088489 A1 | 5/2004 | Hironaka et al. | | |
| 2006/0101207 A1 * | 5/2006 | Nakazato | ...................... | 711/131 |

FOREIGN PATENT DOCUMENTS

| | | |
|---|---|---|
| JP | 3784766 B2 | 3/2006 |
| JP | 2006-139401 A | 6/2006 |
| WO | WO 98/13763 A2 | 4/1998 |

OTHER PUBLICATIONS

Rau, Pseudo-randomly interleaved memory, May 1991, ACM New York, NY, ISCA '91 Proceedings of the 18th annual international symposium on Computer architecture, pp. 74-83.*

(Continued)

*Primary Examiner* — Mardochee Chery
*Assistant Examiner* — Kamal K Dewan
(74) *Attorney, Agent, or Firm* — NSIP Law (57) ABSTRACT

Provided is a multi-port cache memory apparatus and a method of the multi-port cache memory apparatus. The multi-port memory apparatus may divide an address space into address regions and allocate the divided memory regions to cache banks, thereby preventing the concentration of access to a particular cache.

13 Claims, 8 Drawing Sheets

(56) References Cited

OTHER PUBLICATIONS

Harper et al, Vector Access Performance in Parallel Memories Using a Skewed Storage Scheme, Dec. 1987, IEEE Transactions on Computers, vol. C-36, No. 12, pp. 1440-1449.*

Lee, Kiyeon, et al., "Design and Evaluation of a Four-Port Data Cache for High Instruction Level Parallelism Reconfigurable Processors," pp. 1-8.

* cited by examiner

MULTI-PORT CACHE MEMORY APPARATUS AND METHOD

CROSS-REFERENCE TO RELATED APPLICATION(S)

This application claims the benefit under 35 U.S.C. §119(a) of Korean Patent Application No. 10-2011-0017412, filed on Feb. 25, 2011, in the Korean Intellectual Property Office, the entire disclosure of which is incorporated herein by reference for all purposes.

BACKGROUND

1. Field

The following description relates to the allocation of address space to multi-port cache banks for reducing the concentration of data access at a particular cache bank.

2. Description of the Related Art

Generally, an off-chip memory has an operating speed that is slower than that of very-large-scale integration (VLSI) logic, and consequently system performance of the off-chip memory may be less efficient. To overcome the system performance of the off-chip memory, a chip may include a compact and high-speed memory. In this example, access to an off-chip memory may be avoided as much as possible, data process may generally be performed using an internal memory, and the off-chip memory may be used only when necessary. A typical example of an internal memory is a cache.

A recent increase in the integration of a VLSI system has lead to more devices accessing a single memory through multiple ports. A high-performance processor which includes multiple execution units typically includes multiple load/store units that simultaneously access a memory. In addition, a system that uses a multiple processor or a system on chip (SoC) in which a plurality of IPs are integrated into a single chip also has multiple processors and IPs that simultaneously access a memory.

To process simultaneous accesses from multiple IPs or ports, a memory with multiple ports is used. The multi-port cache includes two or more ports that can access a cache for reading and/or writing data, and is capable of processing simultaneous cache memory accesses through the multiple ports. In using multiple caches as described above, concentration of data access to a particular cache may occur thus decreasing the efficiency of the overall system performance.

SUMMARY

In one general aspect, there is provided a multi-port cache memory apparatus including multiple cache banks, and an allocation unit configured to divide an address space into a plurality of address regions of a predefined size, and to allocate a first address region to a first cache bank of the multiple cache banks and to allocate a second address region, following the first address region, to a second cache bank of the multiple cache banks.

The allocation unit may be configured to allocate the divided address regions sequentially to the multiple cache banks.

The allocation unit may be configured to allocate the divided first address region to the first cache bank, and allocate the divided second address region, following the first address region, to the second cache bank that is positioned directly behind the first cache bank.

The allocation unit may be configured to allocate the divided address regions non-sequentially to the multiple cache banks.

The allocation unit may be configured to allocate the divided first address region to the first cache bank, and to allocate the second address region, following the first address region, to a third cache bank that is not positioned directly behind the first cache bank from among the multiple cache banks.

The predefined size of each divided address region may be at least one of a block size of the cache bank and a data size that is small enough to be transmitted at one time through a port.

The multi-port cache memory apparatus may further comprise at least one memory connected to the multiple cache banks, and a data loader configured to store data in the memory in the same order as the order of addresses allocated to the multiple cache banks.

The multi-port cache memory apparatus may further comprise a data changing unit configured to load the data which is non-consecutively stored in the memory, change the loaded data into consecutive data, and transmit the changed data to an external device.

The multi-port cache memory apparatus may further comprise a data rearranging unit configured to rearrange non-consecutive data that is received from at least one of the multiple cache banks into consecutive data, and to store the rearranged data in the memory, or to rearrange consecutive data received from the memory into non-consecutive data and transmit the rearranged non-consecutive data to at least one of the multiple cache banks.

In response to receiving a request signal from at least one of the multiple cache banks to read first data corresponding non-consecutive addresses, the data rearranging unit may be further configured to load, from the memory, second data corresponding to addresses that are present between the first address and the last address of the non-consecutive addresses, extract the first data from the second data, and transmit the extracted first data to the cache bank that issues the request signal.

The data rearranging unit may comprise a temporary storage unit configured to temporarily store at least one of the non-consecutive data and the consecutive data.

In another aspect, there is provided a method of operating a multi-port cache memory apparatus including multiple cache banks, the method including dividing an address space into a plurality of addresses regions of a predefined size, and allocating a first address region to a first cache bank of the multiple cache banks and allocating a second address region, following the first address region, to a second cache bank of the multiple cache banks.

The allocating of the address regions may comprise allocating the divided address regions sequentially to multiple cache banks which include the first cache bank and the second cache bank.

The sequentially allocating of the address regions may comprise allocating the first address region to the first cache bank, and allocating the second address region, following the first address region, to the second cache bank that is positioned directly behind the first cache bank.

The allocating of the address regions may comprise allocating the divided address regions non-sequentially to the multiple cache banks.

The non-sequentially allocating of the address regions may comprise allocating the first address region to the first cache bank, and allocating the second address region, following the first address region, to a third cache bank that is not positioned directly behind the first cache bank from among the multiple cache bank.

The predefined size of each divided address region may be at least one of a block size of the cache bank and a data size that is small enough to be transmitted at one time through a port.

The method may further comprise storing data in a memory in the same order as the order of addresses allocated to the multiple cache banks.

The method may further comprise rearranging non-consecutive data that is received from at least one of the multiple cache banks into consecutive data and storing the rearranged consecutive data in a memory, or rearranging consecutive data received from the memory into non-consecutive data and transmitting the rearranged non-consecutive data to at least one of the multiple cache banks.

The method may further comprise, in response to receiving a request signal from at least one of the multiple cache banks to read first data that corresponds to non-consecutive addresses, loading, from the memory, second data corresponding to addresses that are present between the first address and the last address of the non-consecutive addresses, extracting the first data from the second data, and transmitting the extracted first data to the cache bank that issues the request signal.

In another aspect, there is provided a processor including a cache memory comprising a plurality of cache banks that are configured to process cache memory accesses, a plurality of processing units that are configured to simultaneously access the cache memory, and an allocation unit configured to divide a space of memory into a plurality of memory regions, and to allocate the plurality of memory regions to the plurality of cache banks to prevent a concentration of data access by the plurality of processing units at a cache bank.

The allocation unit may be configured to allocate the plurality of memory regions in sequential order to the plurality of cache banks.

The allocation unit may be configured to allocate the plurality of memory regions in non-sequential order to the plurality of cache banks.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
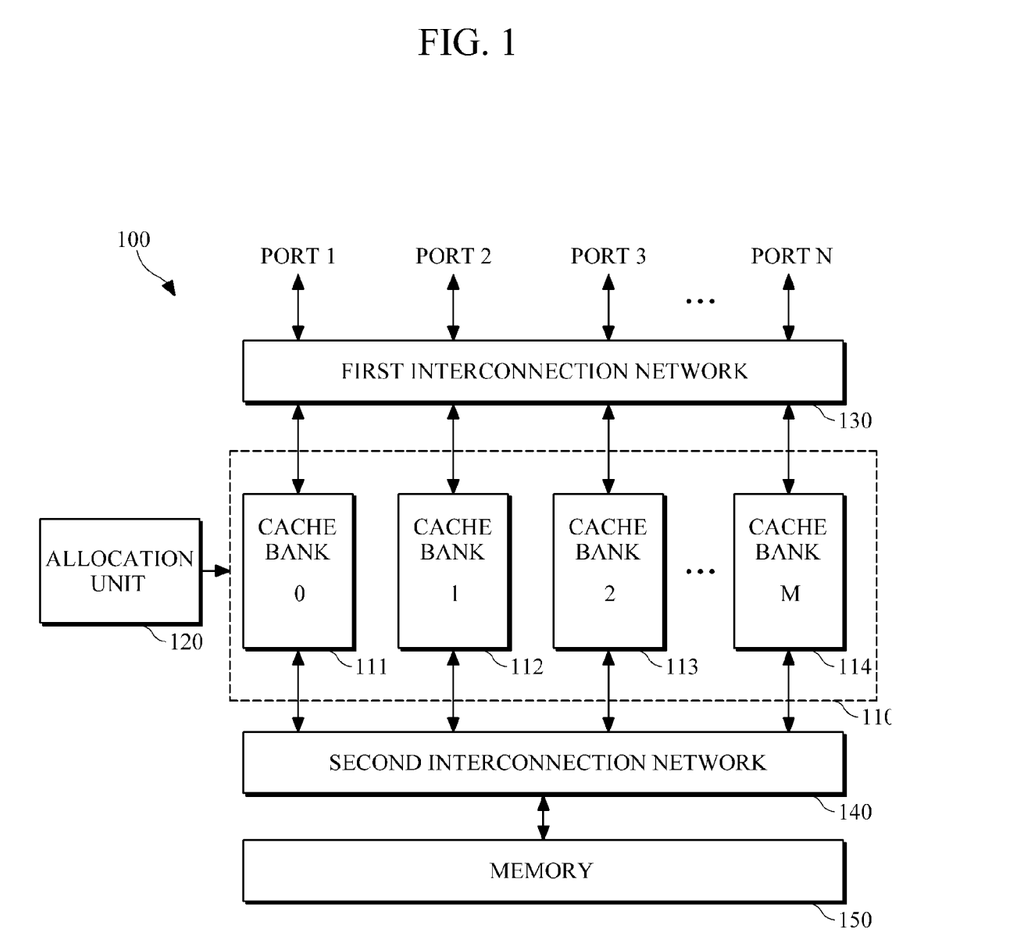
FIG. 1 is a diagram illustrating an example of a multi-port cache memory apparatus.

FIG. 1 illustrates an example of a multi-port cache memory apparatus. The apparatus may be, or may be included in a processor or other device that accesses a memory through multiple ports. For example, the processor or other device may be included in a terminal such as a mobile terminal, a smart phone, a camera, a computer, a tablet, a home appliance, a sensor, and the like Referring to FIG. 1, multi-port cache memory apparatus 100 includes multiple cache banks 110, an allocation unit 120, a first interconnection network 130, a second interconnection network 140, and a memory 150.

In this example, the multiple cache banks 110 include a first cache bank 111, a second cache bank 112, a third cache bank 113, and an $M^{th}$ cache bank 114. Each cache bank may include a core-side port that allows external access to the cache bank and a memory-side port that allows the cache bank to read and/or write data.

The allocation unit 120 may divide an address space into address regions of a predefined size, and allocate a first address region, for example, to the first cache bank 111 and a second address region to the second cache bank 112. The predefined size of the address region may be smaller than the entire address region of one cache bank. For example, the size of each address region may be a block size of the cache bank or a data size that can be transmitted at one time through the port. The block size may refer to a size of one line of a cache bank. The data size may refer to data size that can be transmitted at one time through the core-side port. This scheme is referred to as an interleaving scheme.

The allocation unit 120 may allocate the divided address regions sequentially to the cache banks 111, 112, 113, and 114. For example, the allocation unit 120 may allocate the first address region to the first cache bank 111, and allocate the second address region following the first address region to the second cache bank 112 that is positioned behind the first cache bank 111. The above allocation method is referred to as a sequential scheme. In this example, the phrase "the second cache bank 112 that is positioned behind the first cache bank 111" is used as an example to describe that the second cache bank is the next cache bank in memory that is in sequential order from the first cache bank 111. In the example of FIG. 1, the sequential order of cache banks from left to right is cache bank 0 111, cache bank 1 112, cache bank 2 113, and cache bank 3 114.

In another example, the allocation unit 120 may allocate the divided address regions non-sequentially to the cache banks 111, 112, 113, and 114. For example, the allocation unit 120 may allocate the first address region to the first cache bank 111, and allocate the second address region following the first address region to the third cache bank 113 that is not placed next to the first cache bank. This scheme is referred to as a skewed scheme.

Examples of the sequential and the skewed schemes are described with reference to FIGS. 2, 3, 4, and 5.

The first interconnection network 130 may connect n ports and the multiple cache banks 110. For example, the first interconnection network 130 may be a port-to-cache interconnection network. The first interconnection network 130 may deliver cache bank access to a core-side-port of a corresponding cache bank based on an address region allocated by the allocation unit 120. In other words, the first interconnection network 130 may deliver cache bank access sequentially or non-sequentially to a core-side port.

The second interconnection network 140 may connect the multiple cache banks 110 and the memory 150. For example, the second interconnection network 140 may be a cache-to-memory network. The second interconnection network 140 may deliver memory access that occurs in the multiple cache banks 110 to the memory 150.

As an example, one or more of the first interconnection network 130 and the second interconnection network 140 may be crossbar switches.

The memory 150 may store data. It should be appreciated that the apparatus 100 may include one or more memories 150, for example, two memories, three memories, and the like.

The multi-port cache memory apparatus may divide an address space into several address regions of a predefined size and may allocate the divided address regions sequentially or non-sequentially to cache banks, thereby distributing access to cache banks. Accordingly, the multi-port cache memory apparatus may prevent or otherwise reduce a concentration of access to a particular cache.

Figure 2:
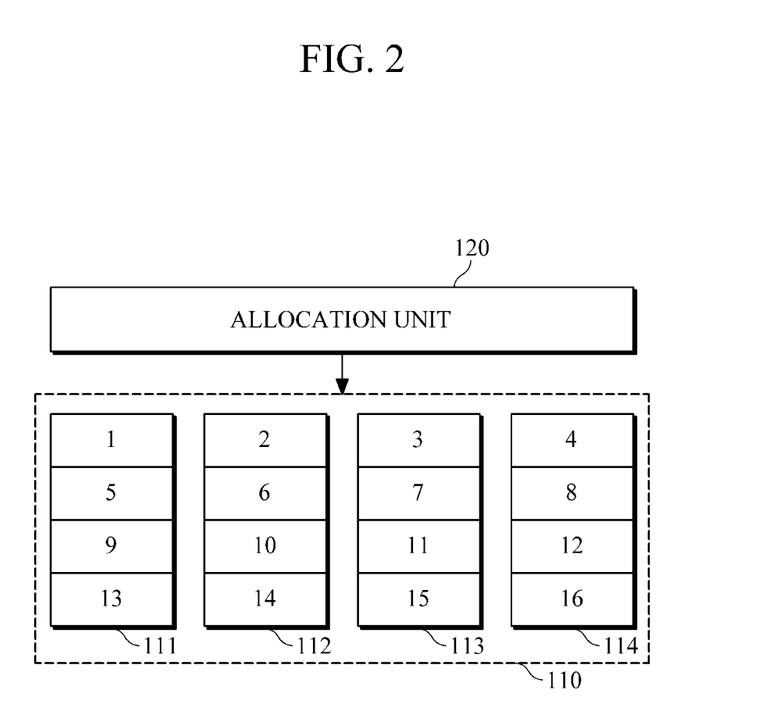
FIG. 2 is a diagram illustrating an example of an allocation unit allocating address regions to cache banks.

FIG. 2 illustrates an example of an allocation unit allocating address regions to cache banks.

Hereinafter, various examples assume that there are four cache banks included in the multiple cache banks, but the number of cache banks is not limited thereto. In addition, the order of allocating the address regions to the cache banks is only for purposes of example, and it should be appreciated that the order may vary. The numbers in each cache bank refer to addresses. For example, '1' indicates an address corresponding to a first address region.

Referring to FIGS. 1 and 2, the allocation unit 120 may divide an address space into the address regions. For example, each address region may have the same size as a block of the cache banks 110. The allocation unit 120 may allocate the divided address regions sequentially to the first cache bank 111, the second cache bank 112, the third cache bank 113, and the fourth cache bank 114.

In this example, the allocation unit 120 allocates the first address region '1' to the first cache bank 111. The first allocation unit 120 allocates a second address region '2,' that directly follows the first address region '1,' to the second cache bank 112 that is positioned behind the first cache bank 111. The allocation unit 120 allocates a third address region '3,' following the second address region '2,' to the third cache bank 113 that is positioned behind the second cache bank 112. In the same manner, the allocation unit 120 allocates a fourth address region '4,' following the third address region '3,' to the fourth cache bank 114 that is positioned behind the third cache bank 113. The allocation unit 120 allocates a fifth address region '5,' following the fourth address region '4,' to the first cache bank 111. By the above procedures, the allocation unit 120 may also allocate the sixth address region '6' through a sixteenth address region '16' sequentially to the first through fourth cache banks 111, 112, 113, and 114 as shown in FIG. 2.

In this example, the divided address regions are allocated to the cache banks in a distributed manner, and thus, the concentration of access to a particular cache bank is prevented.

Figure 3:
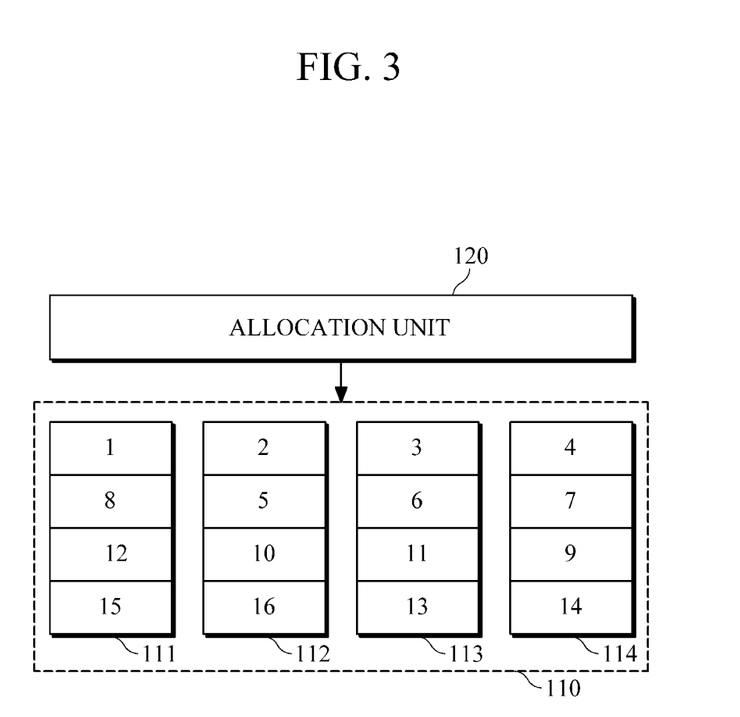
FIG. 3 is a diagram illustrating another example of an allocation unit allocating address regions to the cache bank.

FIG. 3 illustrates another example of an allocation unit allocating address regions to cache banks. Although the example shown in FIG. 3 is described under the assumption that there are four cache banks, the number of cache banks is not limited thereto. Further, the order of allocating the address regions to the cache banks is only an example, and it may vary.

Referring to FIGS. 1 and 3, the allocation unit 120 may divide an address space into address regions. Each address region may be of the same size as a block of the cache banks 110. The allocation unit 120 may allocate the divided address regions non-sequentially to the first cache bank 111, the second cache bank 112, the third cache bank 113, and the fourth cache bank 114 regardless of the order of the cache banks.

In this example, the allocation unit 120 allocates a divided first address region '1' to the first cache bank 111. The allocation unit 120 allocates a second address region '2,' following the first address region '1,' to the second cache bank 112 that is located behind the first cache bank 111. The allocation unit 120 allocates a third address region '3,' following the second address region '2,' to the third cache bank 113 that is located behind the second cache bank 112. The location unit 120 allocates a fourth address region '4,' following the third address region '3,' to the fourth cache bank 114 that is located behind the third cache bank 113.

In this example, the allocation unit 120 allocates a fifth address region '5' to the second cache bank 112. As such, the allocation unit 120 may allocate the fifth address region '5' to another cache bank instead of the first cache bank 111, for example, the second cache bank 112, thereby allocating the address regions non-sequentially to the cache banks 110. The allocation unit 120 may allocate the sixth, seventh, and eighth address regions to various cache banks in no sequential order.

Further, the allocation unit 120 allocates a ninth address region '9' to the fourth cache bank 114. The allocation unit 120 allocates a tenth address region '10,' following the ninth address region '9,' to the second cache bank 112 that is not subsequent to the fourth cache bank 114. Accordingly, the allocation unit 120 may allocate the address regions to the cache banks 110 non-sequentially.

Through the above procedures, the allocation unit 120 allocates a thirteenth address region '13' through a sixteenth address region '16' non-sequentially to the first to fourth cache banks 111, 112, 113, and 114.

In this example, the cache banks are allocated in a distributed manner, and thus, the concentration of access to a particular cache bank can be prevented.

Figure 4:
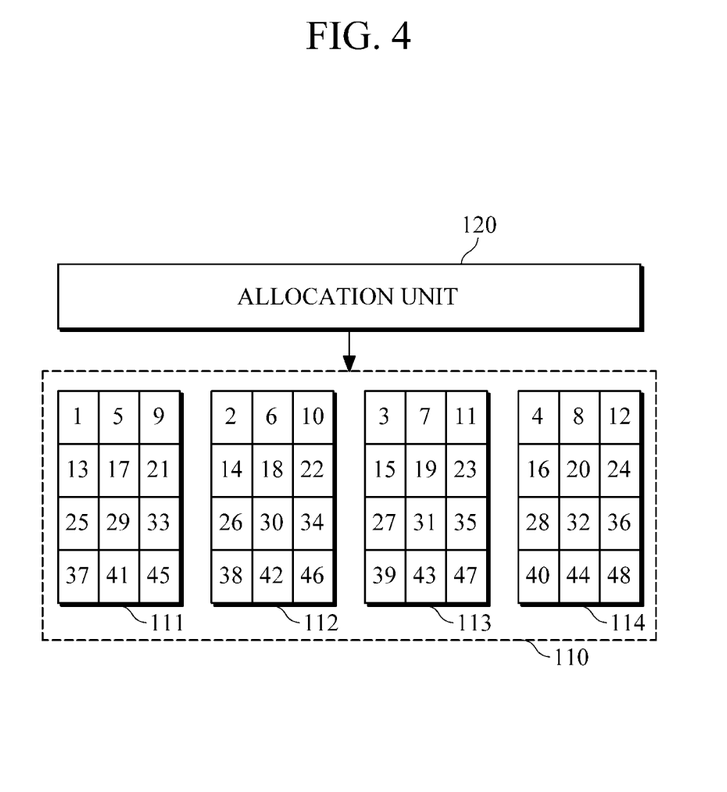
FIG. 4 is a diagram illustrating another example of an allocation unit allocating address regions to cache banks.

FIG. 4 illustrates another example of an allocation unit allocating address regions to cache banks. Although the example shown in FIG. 4 is described under the assumption that there are four cache banks, the number of cache banks is not limited thereto. In addition, the order of allocating the address regions to the cache banks is only for purposes of example, and it may vary.

Referring to FIGS. 1 and 4, the allocation unit 120 may divide an address space into address regions. Each address region may have a data size that is small enough to be transmitted through a port at one time. The allocation unit 120 may allocate the divided address regions to the first cache bank 111, the second cache bank 112, the third cache bank 113, and the fourth cache bank 114 in order.

In this example, the allocation unit 120 allocates a first address region '1' to the first cache bank 111. The allocation unit 120 allocates a second address region '2,' following the first address region '1,' to the second cache bank 112 that is positioned directly behind the first cache bank 111. The allocation unit 120 allocates a third address region '3,' following the second address region '2,' to the third cache bank 113 that is positioned behind the second cache bank 112. The allocation unit 120 allocates a fourth address region '4,' following the third address region '3,' to the fourth cache bank 114 that is positioned behind the third cache bank 113. The allocation unit 120 allocates a fifth address region '5,' following the fourth address region '4,' to the first cache bank 111.

In the same manner, the allocation unit 120 allocates a sixth address region '6,' following the fifth address region '5,' to the second cache bank 112 that is positioned behind the first cache bank 111. The allocation unit 120 allocates a seventh address region '7,' following the sixth address region '6,' to the third cache bank 113 that is positioned behind the second cache bank 112. The allocation unit 120 allocates an eighth address region '8,' following the seventh address region '7,' to the fourth cache bank 114 that is positioned behind the third cache bank 113.

Through the above procedures, the allocation unit 120 may allocate a ninth address region '9' through a forty-eighth address region '48' sequentially through the first to fourth cache banks 111, 112, 113, and 114.

In this example, by allocating the divided address regions in a distributed manner, the concentration of access to a particular cache bank can be prevented.

Figure 5:
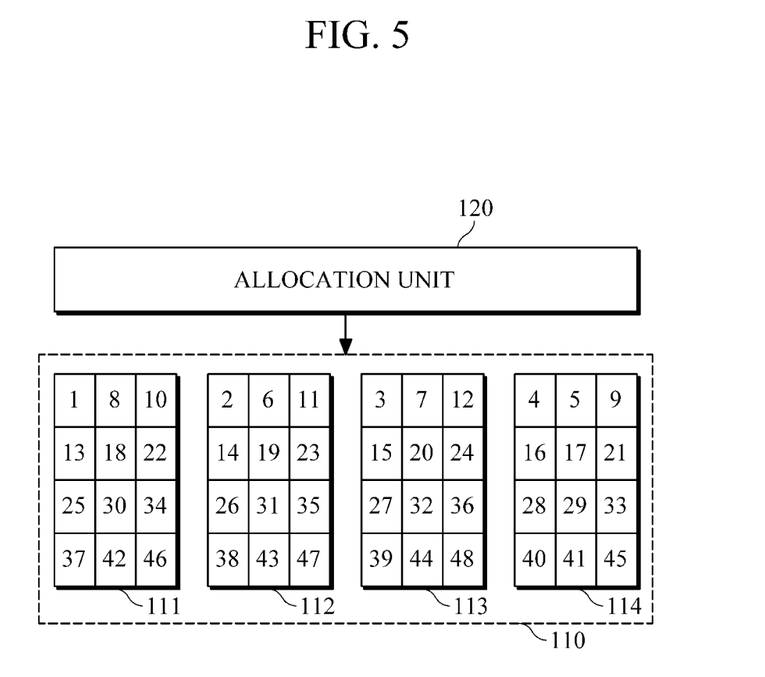
FIG. 5 is a diagram illustrating another example of an allocation unit allocating address regions to cache banks.

FIG. 5 illustrates another example of an allocation unit allocating address regions to cache banks.

Referring to FIGS. 1 and 5, the allocation unit 120 may divide an address space into address regions. Each address region may have a data size that is small enough to be transmitted at one time through a port. The allocation unit 120 may allocate the divided address regions non-sequentially to the first cache bank 111, the second cache bank 112, the third cache bank 113, and the fourth cache bank 114, regardless of the order of the cache banks.

In this example, the allocation unit 120 allocates the first address region '1' to the first cache bank 111. The allocation unit 120 allocates a second address region '2,' following the first address region '1,' to the second cache bank 112 that is located behind the first cache bank 111. The allocation unit 120 allocates a third address region '3,' following the second address region '2,' to the third cache bank 113 that is positioned behind the second cache bank 112. The allocation unit 120 allocates a fourth address region '4,' following the third address region '3,' to the fourth cache bank 114 that is positioned behind the third cache bank 113.

In this example, the allocation unit 120 allocates a fifth address region '5' to the fourth cache bank 114. As such, the allocation unit 120 allocates the fifth address region '5' to a cache bank other than the first cache bank 111, for example, the fourth cache bank 114, thereby allocating the address regions non-sequentially to the cache banks 110.

The allocation unit 120 allocates a sixth address region '6,' following the fifth address region '5,' to the second cache bank 112 that is not positioned subsequent to the fourth cache bank 114. Accordingly, the allocation unit 120 may allocate the address regions non-sequentially to the cache banks 110.

Through the above procedures, the allocation unit 120 may allocate a seventh address region '7' through a forty-eighth address region '48' non-sequentially to the first through fourth cache banks 111, 112, 113, and 114.

The allocation of the divided address regions in a distributed manner as described herein may prevent the concentration of access to a particular cache bank from occurring.

Figure 6:
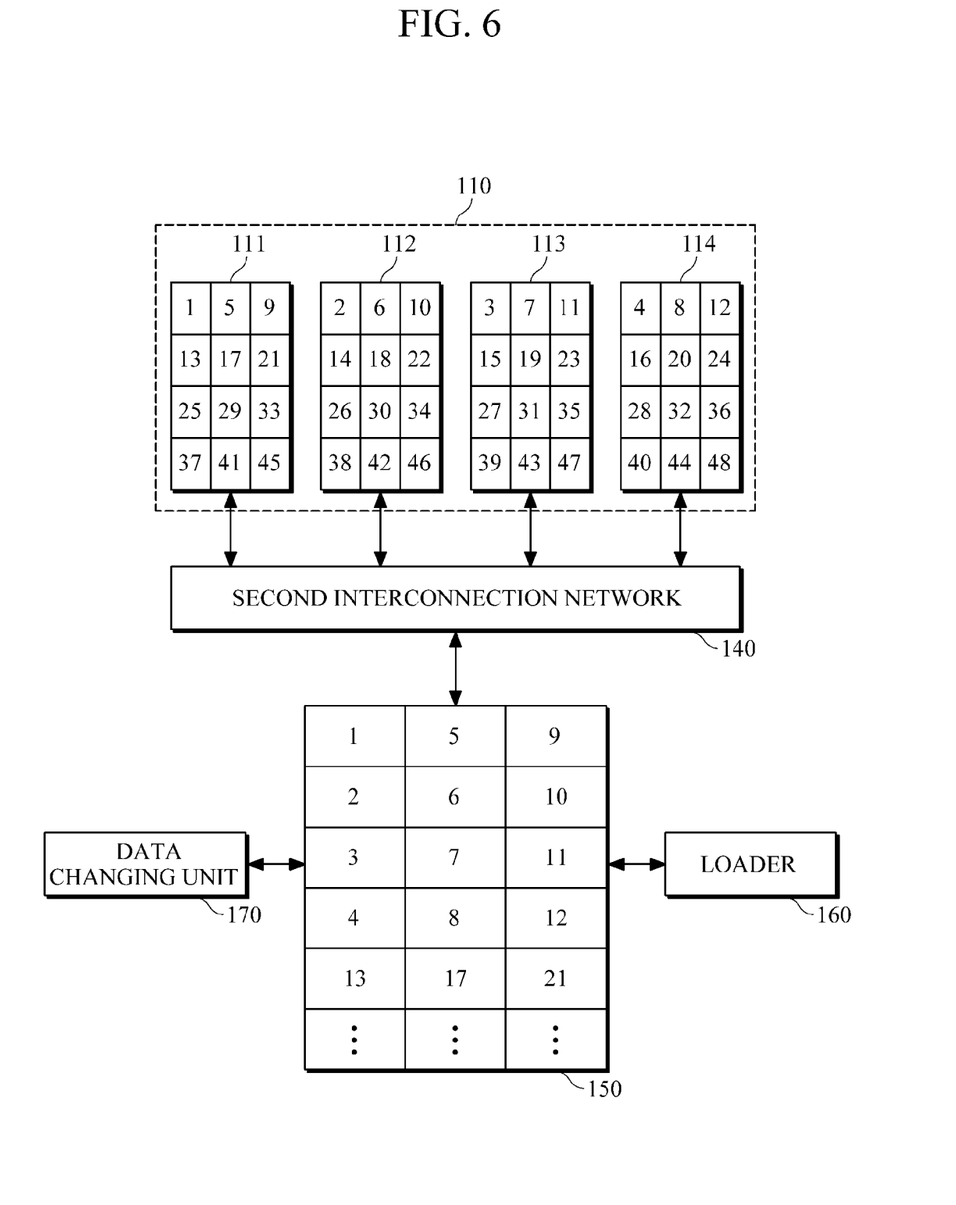
FIG. 6 is a diagram illustrating another example of a multi-port cache memory apparatus.

FIG. 6 illustrates another example of a multi-port cache memory apparatus.

Referring to FIGS. 1 and 6, multi-port cache memory apparatus 100 includes multiple cache banks 110, a second interconnection network 140, a memory 150, a loader 160, and a data changing unit 170.

In this example, the cache banks 110 include a first cache bank 111, a second cache bank 112, a third cache bank 113, and a fourth cache bank 114.

The second interconnection network 140 connects the multiple cache banks 110 and the memory 150. For example, the second interconnection network 140 may deliver memory access from the multiple cache banks 110 to the memory 150.

The memory 150 may store data.

The loader 160 may store data in the memory 150 in the same order as addresses allocated to the cache banks 111, 112, 113, and 114. For example, the loader 160 may store data in the memory 150 in the same order as addresses '1, 5, 9' which are allocated to a first block of the first cache bank 111. In addition, the loader 160 may store data in the memory 150 in the same order as addresses '2, 6, 10' which are allocated to a first block of the second cache bank 112. In other words, the loader 160 may store the data in the memory 150 not in the original order of the addresses '1, 2, 3, 4, 5, . . . ' but in the order of the addresses that are allocated to the cache banks 111, 112, 113, and 114. In this example, because pieces of data corresponding to non-consecutively allocated addresses (e.g., '1, 5, 9') are consecutively stored, the loading time may be reduced when each cache bank loads the data corresponding to the non-consecutively allocated addresses (e.g., '1, 5, 9') from the memory 150.

The data changing unit 170 may load pieces of data corresponding to the non-consecutive addresses from the memory 150. The data changing unit 170 may change the loaded data into consecutive data, and may transmit the changed data to an external device. In this example, pieces of data are stored in the memory 150 corresponding to the non-consecutively allocated addresses (e.g., '1, 5, 9'). Thus, it may not be possible for an external device to directly use the data stored in the memory 150. Accordingly, the data changing unit 170 may change the data that is non-consecutively stored in the memory 150 to be consecutive data, and may transmit the changed data to the external device.

Consequently, the external device is able to load consecutive data corresponding to the consecutive addresses '1, 2, 3 . . . .'

Figure 7:
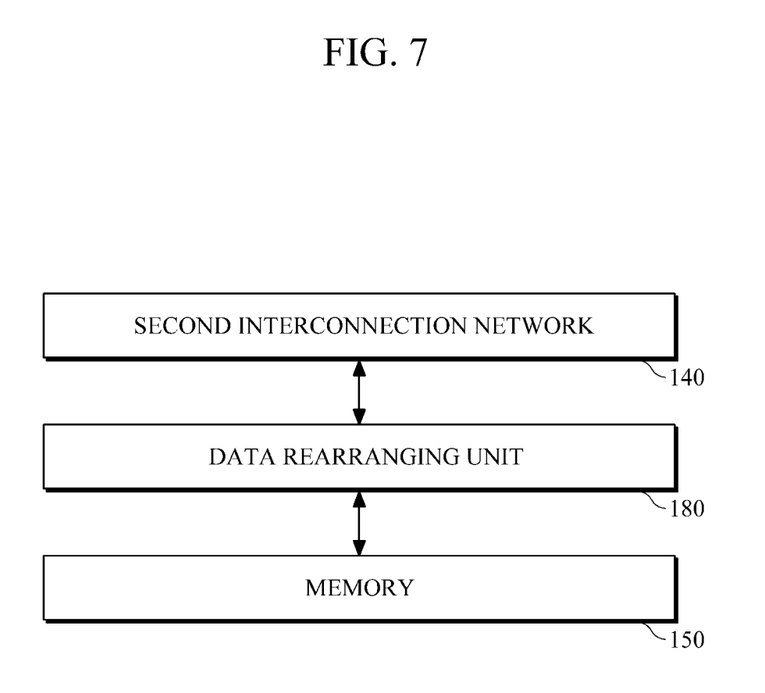
FIG. 7 is a diagram illustrating another example of a multi-port cache memory apparatus.

FIG. 7 illustrates another example of a multi-port cache memory apparatus.

Referring to FIGS. 1 and 7, multi-port cache memory apparatus 100 includes a second interconnection network 140, a memory 150, and a data rearranging unit 180.

The second interconnection network 140 connects the multiple cache banks 110 and the memory 150. For example, the second interconnection network 140 may deliver memory access that occurs in the multiple cache banks 110 to the memory 150.

The memory 150 may store data.

The data rearranging unit 180 may be interposed between the second interconnection network 140 and the memory 150. As another example, the data rearranging unit 180 may be interposed between the cache banks 110 and the memory 150. The data rearranging unit 180 may include a temporary storage unit (not shown). The temporary storage unit may be a buffer, a cache, a lower-level cache, and the like.

The data rearranging unit 180 may rearrange data. For example, the data rearranging unit 180 may rearrange non-consecutive data to be consecutive data, or consecutive data to be non-consecutive data. For example, the data rearranging unit 180 may rearrange non-consecutive data received from the cache banks 110 into consecutive data and store rearranged data in the memory 150, or may rearrange consecutive data received from the memory 150 into non-consecutive data and transmit the rearranged data to the cache banks 110.

For example, in response to receiving a request signal from the cache banks through the second interconnection network 140 to read first data that corresponds to non-consecutive addresses (e.g., '1, 5, 9'), the data rearranging unit 180 may load second data (data corresponding to addresses '1, 2, 3, 4, 5, 6, 7, 8, and 9') that is present between the first address '1' and the last address '9' from the memory 150, and may store the second data in the temporary storage unit. In this example, the data rearranging unit 180 may extract the first data that corresponds to the non-consecutive addresses (e.g., '1, 5, 9') from the second data, and transmit the extracted first data to the cache banks 110.

In response to receiving a request signal from the cache banks to read third data that corresponds to non-consecutive addresses (e.g., '2, 4, 8'), the data rearranging unit 180 may transmit directly to the cache banks 110 the third data that corresponds to the non-consecutive addresses (e.g., '2, 4, 8') that is stored in the temporary storage unit without accessing the memory 150.

In another example, in response to receiving a request signal from the cache bank 110 to write fourth data corresponding to non-consecutive addresses (e.g., '1, 3, 5'), the data rearranging unit 180 may store the fourth data in the temporary storage unit. In response to receiving a request signal from the cache bank 110 to write fifth data corresponding to non-consecutive address (e.g., '2, 4, 6'), the data rearranging unit 180 may store the fifth data along with the fourth data in the temporary storage unit in the memory 150. In this example, the data corresponding to non-consecutive addresses is not stored in the memory 150 each time a request signal is received. Instead, the data corresponding to the non-consecutive memory is stored in the temporary storage unit, and when pieces of data stored in the temporary storage unit become consecutive complete data blocks, the data rearranging unit 180 may store the consecutive data blocks in the memory 150.

In another example, in response to receiving a request signal from the cache bank 110 to write sixth data corresponding to non-consecutive addresses (e.g., '1, 3, 5'), the data rearranging unit 180 may store seventh data that corresponds to consecutive addresses '1, 2, 3, 4, 5' which are present among the non-consecutive addresses. The seventh data may be stored in the temporary storage unit. The data rearranging unit 180 may overwrite the seventh data with the sixth data. If another data is to be stored in the temporary storage unit, the data rearranging unit 180 may store the overwritten seventh data in the memory 150.

It should be appreciated that the data rearranging unit 180 may utilize various methods in addition to the described reading and writing methods.

As such, in a case in which requests for access to non-consecutive addresses are received, data process may be performed in the same manner as when requests for access to consecutive addresses are received. Accordingly, system performance can be maintained at the same level as in the case of processing access to consecutive addresses.

Figure 8:
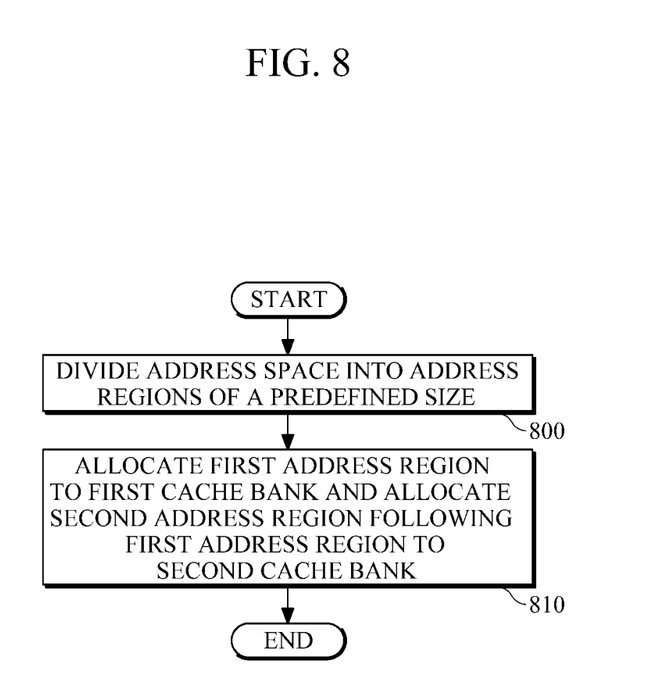
FIG. 8 is a flowchart illustrating an example of a method of operating a multi-port cache memory apparatus.

FIG. 8 illustrates an example of a method of operating a multi-port cache memory apparatus.

Referring to FIG. 8, the multi-port cache memory apparatus divides an address space into address regions of a predefined size (800). For example, the predefined size of each address region may be the same as a block of a cache bank or may be a data size that is small enough to be transmitted at one time through a port. The multi-port cache memory apparatus allocates a first address region to a first cache bank, and a second address region which follows the first address region to a second cache bank (810).

For example, the multi-port cache memory apparatus may allocate the divided address regions sequentially to the cache banks. In particular, the multi-port cache memory apparatus may allocate the first address region to the first cache bank, and allocate the second address region, following the first address region, to the second cache bank that is positioned behind the first cache bank.

As another example, the multi-port cache memory apparatus may allocate the divided address regions non-sequentially to the cache banks. For example, the multi-cache memory may allocate a first address region to a first cache bank, and allocate a second address region, following the first address region, to a second cache bank that is not positioned directly behind the first cache bank.

The multi-port cache memory apparatus may store data in a memory in the same order that the addresses are allocated to the cache banks. In response to receiving a request signal from a cache bank to read first data corresponding to non-consecutive addresses, the multi-port cache memory apparatus may load second data corresponding to addresses between the first address and the last address of the non-consecutive addresses from the memory. The multi-port cache memory apparatus may extract the first data from the second data and transmit the extracted first data to the cache bank.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or is computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described herein. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A multi-port cache memory apparatus comprising:
    multiple cache banks; and
    an allocation unit configured to divide an address space into a plurality of address regions of a predefined size, and to allocate the divided address regions non-sequentially to the multiple cache banks,
    wherein the allocation unit is configured to allocate a first address region to a first cache bank of the multiple cache banks, and to allocate a second address region, following the first address region, to a third cache bank that is not positioned directly behind the first cache bank from among the multiple cache banks.

2. The multi-port cache memory apparatus of claim 1, wherein the predefined size of each divided address region is at least one of a block size of the cache bank and a data size that is small enough to be transmitted at one time through a port.

3. The multi-port cache memory apparatus of claim 1, further comprising:
    at least one memory connected to the multiple cache banks; and
    a data loader configured to store data in the memory in the same order as the order of addresses allocated to the multiple cache banks.

4. The multi-port cache memory apparatus of claim 3, further comprising:
    a data changing unit configured to load the data which is non-consecutively stored in the memory, change the loaded data into consecutive data, and transmit the changed data to an external device.

5. The multi-port cache memory apparatus of claim 1, further comprising:
    a data rearranging unit configured to rearrange non-consecutive data that is received from at least one of the multiple cache banks into consecutive data, and to store the rearranged data in the memory, or to rearrange consecutive data received from the memory into non-consecutive data and transmit the rearranged non-consecutive data to at least one of the multiple cache banks.

6. The multi-port memory apparatus of claim 5, wherein, in response to receiving a request signal from at least one of the multiple cache banks to read first data corresponding non-consecutive addresses, the data rearranging unit is further configured to
    load, from the memory, second data corresponding to addresses that are present between the first address and the last address of the non-consecutive addresses,
    extract the first data from the second data, and
    transmit the extracted first data to the cache bank that issues the request signal.

7. The multi-port cache memory apparatus of claim 5, wherein the data rearranging unit comprises a temporary storage unit configured to temporarily store at least one of the non-consecutive data and the consecutive data.

8. A method of operating a multi-port cache memory apparatus including multiple cache banks, the method comprising:
    dividing an address space into a plurality of addresses regions of a predefined size; and
    allocating the divided address regions non-sequentially to the multiple cache banks,
    wherein the non-sequentially allocating of the address regions comprises allocating a first address region to a first cache bank of the cache banks, and allocating the second address region, following the first address region, to a third cache bank that is not positioned directly behind the first cache bank from among the multiple cache bank.

9. The method of claim 8, wherein the predefined size of each divided address region is at least one of a block size of the cache bank and a data size that is small enough to be transmitted at one time through a port.

10. The method of claim 8, further comprising:
    storing data in a memory in the same order as the order of addresses allocated to the multiple cache banks.

11. The method of claim 8, further comprising:
    rearranging non-consecutive data that is received from at least one of the multiple cache banks into consecutive data and storing the rearranged consecutive data in a memory; or
    rearranging consecutive data received from the memory into non-consecutive data and transmitting the rearranged non-consecutive data to at least one of the multiple cache banks.

12. The method of claim 11, further comprising, in response to receiving a request signal from at least one of the multiple cache banks to read first data that corresponds to non-consecutive addresses,
    loading, from the memory, second data corresponding to addresses that are present between the first address and the last address of the non-consecutive addresses,
    extracting the first data from the second data, and
    transmitting the extracted first data to the cache bank that issues the request signal.

13. A processor comprising:
    a cache memory comprising a plurality of cache banks that are configured to process cache memory accesses;
    a plurality of processing units that are configured to simultaneously access the cache memory; and
    an allocation unit configured to divide a space of memory into a plurality of memory regions, and to allocate the plurality of memory regions in non-sequential order to the plurality of cache banks to prevent a concentration of data access by the plurality of processing units at a cache bank, wherein the allocation unit is configured to allocate a first address region to a first cache bank, and to allocate a second address region, following the first address region, to a third cache bank that is not positioned directly behind the first cache bank from among the multiple cache banks.

* * * * *